(No Model.)
E. J. BARBER & T. F. WHITE.
WINDLASS.
No. 348,446. Patented Aug. 31, 1886.
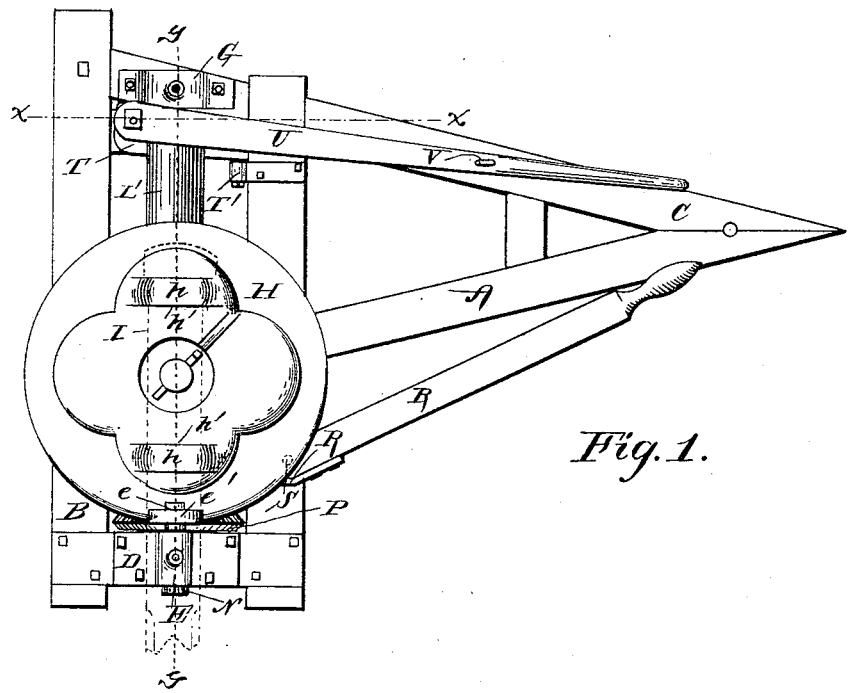
Fig. 1.
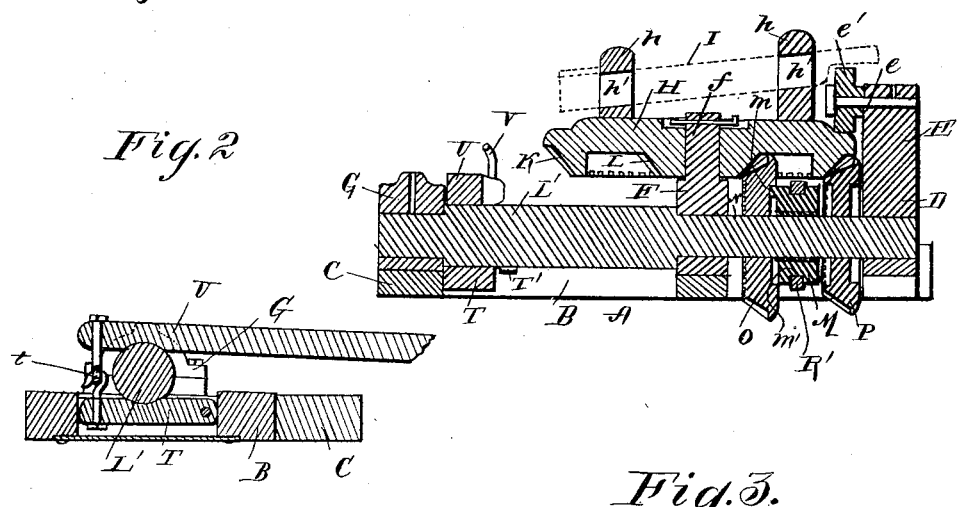
Fig. 2.
Fig. 3.
Witnesses
James M. Hilton
J. W. Garner
Inventor
Edwin J. Barber
Thomas F. White
By their Attorneys

UNITED STATES PATENT OFFICE.

EDWIN J. BARBER AND THOMAS F. WHITE, OF SALEM, KANSAS.

WINDLASS.

SPECIFICATION forming part of Letters Patent No. 348,446, dated August 31, 1886.

Application filed April 16, 1886. Serial No. 199,125. (No model.)

*To all whom it may concern:*

Be it known that we, EDWIN J. BARBER and THOMAS F. WHITE, citizens of the United States, residing at Salem, in the county of Jewell and State of Kansas, have invented a new and useful Improvement in Windlasses, of which the following is a specification.

This invention is an improved windlass adapted to raise or lower a well-auger; and it consists in the peculiar construction and combination of devices, that will be more fully set forth hereinafter, and particularly pointed out in the claims.

In the drawings, Figure 1 is a top plan view of our invention. Fig. 2 is a vertical sectional view taken on the line $x\ x$ of Fig. 1. Fig. 3 is a vertical longitudinal sectional view taken on the line $y\ y$ of Fig. 1.

A represents a frame having the rectangular portion B and the projecting triangular portion C, which extends from one side of the frame, near one end thereof. The rectangular portion of the frame is provided at one end with a bearing-block, D, from which rises a vertical standard, E, and suitable blocks, F and G, are also secured to the portion B of the frame in a line with the block D. From the upper side of the block F projects a vertical spindle, $f$, on which is journaled a horizontal master-wheel, H, which is provided on its upper side with vertical ears $h$, having openings $h'$, to receive a sweep-lever, I, to which the horse or other draft-animal is attached in the usual way. The under side of the master-wheel, at the rim thereof, is provided with beveled gear-teeth K, and at a suitable distance from the center of the master-wheel, on its under side, is a second series of beveled gear-teeth, L, which are concentric with the teeth K.

L' represents a horizontal drum or windlass, which is journaled in the blocks D, F, and G. To the center of that portion of the shaft of the windlass which is between the blocks D and F is secured a sliding clutch, M, which is feathered on the shaft and is adapted to move laterally thereon, and is provided on its opposite side with engaging teeth or projections $m$, and which has a groove, $m'$, in the center of its periphery. On the shaft N of the windlass, on the inner side of the clutch M, is a loose wheel, O, having beveled gear-teeth adapted to mesh with the teeth L of the master-wheel. On the opposite side of the clutch M on the said shaft is a loose wheel, P, which is also provided with beveled gear-teeth that are adapted to engage the teeth K of the master-wheel. The said wheels O and P on their opposing sides are provided with notches to receive the projections of the clutch M, when the latter is moved so as to engage with either of the said wheels, in order to lock one of them to the shaft.

R represents a lever, which is fulcrumed to the portion B of the frame at the point S, and is provided at its inner end with an arm, R', the inner end of which is bifurcated and caused to engage with the groove $m'$ of the clutch. By moving the outer end of the lever R laterally it will be readily understood that the clutch may be caused to engage with either of the wheels O and P, and thus lock them to the shaft of the windlass. The standard E, which projects from the upper side of the block D, carries a horizontal inwardly-projecting spindle, $e$, on which is journaled a roller, $e'$, which bears upon the upper side of the master-wheel, thus preventing the master-wheel from "wabbling" on the spindle $f$, and keeping its gear-teeth K and L firmly engaged with the wheels O and P.

T represents a brake-block, which has one end pivoted to a strap, T', that is secured to the frame. The said brake-block is on the under side of one end of the windlass, and is connected by a hinged joint, $t$, to one end of a brake-lever, U, which bears on the upper side of the windlass. Near the outer end of the lever U is a vertical opening, through which passes a curved guiding-arm, V, which projects from the upper side of the portion C of the frame. By bearing down upon the outer end of the lever U it will be readily seen that the inner end of the said lever will be caused to bear upon the upper side of the windlass, and that the brake-block T will be raised and caused to bear on the under side of the windlass, thereby clamping the windlass between the block and the lever, thus providing an effectual brake therefor. When it is desired to rotate the windlass rapidly, the clutch M will be moved to lock the wheel P to the windlass-shaft, and when it is desired to rotate the windlass with decreased speed the clutch M will be moved inwardly and caused to lock the wheel O to the windlass-shaft. In order to bring the windlass to a standstill, the clutch is moved midway between the wheels O and P and out of engagement with both of them.

Having thus described our invention, we claim—

1. The combination of the windlass having the shaft provided with the feathered clutch, and the loose wheels O and P, the master-wheel having on its under side the teeth K, to engage with the wheel P, and the teeth L, to engage with the wheel O, and the ears $h$ on the upper side of the master-wheel, having openings $h'$, the sweep-lever secured in the said openings, the roller bearing on the upper side of the master-wheel, and the lever to move the feathered clutch, substantially as described.

2. The combination, with the shaft or windlass, of the pivoted or hinged brake-block T on one side thereof, the brake-lever V, bearing on the opposite side of the shaft or windlass, and the link $t$, connecting the free end of the block T with the brake-lever, whereby the said shaft or windlass will be compressed between the brake-block and the lever when power is applied to the latter, substantially as described.

3. The combination, with the windlass and means for rotating the same, of the brake-block T on one side of the windlass, and the brake-lever U, hinged to the brake-block and bearing on the opposite side of the windlass, for the purpose set forth, substantially as described.

In testimony that we claim the foregoing as our own we have hereto affixed our signatures in presence of two witnesses.

EDWIN J. BARBER.
THOMAS F. WHITE.

Witnesses:
T. D. WILLIAMS,
W. D. COOK.